United States Patent
Chu et al.

[11] Patent Number: 5,646,080
[45] Date of Patent: Jul. 8, 1997

[54] DIELECTRIC STABLE AT HIGH TEMPERATURE

[75] Inventors: Mike Ssu-Hai Chu, Lewiston; John Bultitude, Youngstown, both of N.Y.; Michael Rand, Witney, United Kingdom; Kay Louise Nimmo, Wallingford, United Kingdom; Ian Thompson, Buckingham, United Kingdom; Christopher Hood, Reading, United Kingdom

[73] Assignee: Tam Ceramics, Inc., Niagara Falls, N.Y.

[21] Appl. No.: 561,122

[22] Filed: Nov. 20, 1995

[51] Int. Cl.$^6$ ............................................. C04B 35/468
[52] U.S. Cl. ........................... 501/137; 501/138; 501/139
[58] Field of Search ......................... 501/137, 138, 501/139

[56] References Cited

U.S. PATENT DOCUMENTS

| | | | |
|---|---|---|---|
| H957 | 8/1991 | Buchanan et al. | |
| 4,089,813 | 5/1978 | Alexander et al. | 501/137 |
| 4,610,970 | 9/1986 | Wada et al. | 501/138 |
| 4,999,736 | 3/1991 | Kishi et al. | 501/137 |
| 5,006,954 | 4/1991 | Kishi et al. | 501/137 |
| 5,089,933 | 2/1992 | Saito et al. | |
| 5,268,342 | 12/1993 | Nishiyama et al. | 501/138 |
| 5,322,828 | 6/1994 | Sano et al. | 501/137 |
| 5,397,753 | 3/1995 | Nishiyama et al. | 501/138 |
| 5,453,409 | 9/1995 | Kishi et al. | 501/138 |

FOREIGN PATENT DOCUMENTS

| | | |
|---|---|---|
| 4220681 | 1/1993 | Germany. |
| 521267 | 1/1993 | Japan. |
| 536308 | 2/1993 | Japan. |
| 6206766 | 7/1994 | Japan. |

OTHER PUBLICATIONS

H. Saito et al., "X7R Multilayer Ceramic Capacitors with Nickel Electrodes" in Jap.J. of Applied Phy., vol. 30, No. 98, Sep. 1991, pp. 2307–2310.

Y. Sakabe et al., "New Barium Titanate Based Material For MLCs with Ni Electrode" in Ferroelectrics, vol. 133, 1992, pp. 133–138 (No Month).

N. Kikuchi et al., "Development of Dielectric Material With X8R Characteristic" in Ceramic Transaction, 32, 1993, pp. 191–200 (No Month).

M.S.H. Chu et al., "Processing and Development of High Fire X7R Dielectric Powder for Multilayer Capacitors" in Ceramic Transactions, 32, 1993, pp. 69–80 (No Month).

Chemical Abstracts, vol. 80, No. 24 (Jun. 17, 1974), 138426, H. Taki et al., "Dielectric Ceramics With Small Temperature Dependence of Dielectric Constant" from JP–A–48097095.

Database WPI, week 8411, Derwent Pub., AN 84–65312, "High Dielectric Ceramic Composition . . . Calcium Titanate" from JP–A–59020905 (Feb. '84).

*Primary Examiner*—Mark L. Bell
*Assistant Examiner*—David Sample
*Attorney, Agent, or Firm*—Watson Cole Stevens Davis, P.L.L.C.

[57] ABSTRACT

A sinterable dielectric ceramic powder composition comprising 95 to 98 parts by weight of a major ingredient consisting of 97.0 to 99.5 mole % barium titanate, 0.5 to 3.0 mole % magnesium oxide or a precursor therefor and 0 to 2.0 mole % manganese oxide or a precursor therefor and 0 to 0.2 mole % cobalt oxide or a precursor therefor; 2 to 5 parts by weight of a minor ingredient consisting of a ternary mixture of 15 to 30 mole % barium oxide or a precursor therefor, 15 to 30 mole % silicon dioxide or a precursor therefor and 40 to 70 mole % calcium titanate, which composition can be fabricated into multilayer ceramic capacitors with nickel, nickel alloy, palladium or palladium/silver alloy inner electrodes, the so formed capacitors having a variation of capacitance with temperature of less than ±20% over the range −55° C. to 140° C. as compared to the value at 25° C. and not containing any second phases after sintering.

6 Claims, 1 Drawing Sheet

DIELECTRIC STABLE AT HIGH TEMPERATURE

BACKGROUND OF THE INVENTION

The present invention relates to a temperature stable dielectric and, in particular, to a barium titanate dielectric composition which remains stable at high temperatures, which can be used to produce multilayer ceramic capacitors with base metals, such as nickel as internal conductive electrodes. The multilayer capacitors thus produced have a variation of capacitance with temperature of less than ±20% over the temperature range −55° C. to 140° C. as compared to the value at 25° C. and no second phases were apparent in the microstructures.

The present invention also relates to a temperature stable dielectric and, in particular, to a barium titanate dielectric composition, which can be used to produce multilayer ceramic capacitors with noble metals, such as palladium or palladium/silver alloys, as internal conductive electrodes. The multilayer ceramic capacitors thus produced have their variation of capacitance with temperature less than ±20% over the temperature range −55° C. to 140° C. as compared to the value at 25° C. In a further embodiment of the invention the variation of capacitance with temperature is less than ±15% over the temperature range −55° C. to 145° C. as compared to the value at 25° C. The ceramic microstructures of the above capacitors do not contain second phases when examined by Scanning Electron Microscopy using electron backscattering.

Multilayer ceramic capacitors are well known in the art and have been manufactured for many years by a variety of processes, all of which result in alternate layers of a ceramic dielectric composition and metal in the devices. The typical manufacturing processes require the co-sintering of the ceramic dielectric composition and metal to consolidate these materials into working devices. The co-sintering process is generally carried out in an air atmosphere and thus the inner electrodes of the devices generally comprise a precious metal such as platinum, gold, palladium, or alloys thereof, to avoid oxidation during the sintering process.

Inner electrodes made from precious metals are very expensive. Ceramic dielectric materials for the manufacture of temperature stable multilayer ceramic capacitors with nickel inner electrodes have been reported in the articles and patents described below. In all of these cases a variation of capacitance with temperature of less than ±15% over the range −55° C. to 125° C. as compared to the value at 25° C. is exhibited.

PRIOR ART

Japanese Journal of Applied Physics, 30, 2307–2310 (1991) discloses the properties of X7R multilayer ceramic capacitors with nickel electrodes. The X7R designation indicates a temperature variation of capacitance with respect to the value at 25° C. (ΔC) of ±15% over the temperature range −55° C. to +125° C. The dielectric constant =3200 and dissipation factor =1.7% at 25° C. In this case the composition consisted of $(Ba_{1.01}Mg_{0.01})O_{1.02}(Ti_{0.98}Zr_{0.02})O_2$ with additions of $Ho_2O_3$ and a glass frit containing $Li_2O-SiO_2-CaO$. At 125° C. the capacitance value was +7% of the value at 25° C. and becoming more positive with increasing temperature but no disclosure of performance at higher temperature was made.

Ferroelectrics 1992, volume 133, p133–138 discloses a material made from a mixture of $BaTiO_3$, $Dy_2O_3$, $Co_2O_3$, MgO, $MnO_2$, $BaCO_3$ and a glass frit of $Li_2O-Al_2O_3-SiO_2$. This was reported to have a dielectric constant=3590 and dissipation factor=1.6% also with X7R characteristics. In this case the capacitance value at 125° C. was −12% of the value at 25° C. and becoming more negative with increasing temperature.

Japanese Patents Nos 5-21267 and 6-206766 and U.S. Pat. No. 5,089,933 disclose further compositions which can fulfil the X7R characteristics but because of the tendency for capacitance to become more negative at higher temperatures multilayer capacitors manufactured from these compositions can only be operated in the range −55° C. to +125° C. Multilayer ceramic capacitors with higher temperature durability are required for applications where electronic systems are placed in close proximity to sources of heat for instance near to engines in cars. Japanese Patent No. 63-36308 discloses ceramic formulation for use in multilayer ceramic capacitors with precious metals which have ΔC=±15% over the temperature range −55° C. to +150° C., which are capable of meeting the X8R designation. However, these formulations are not suitable for use with nickel since they contain $Nb_2O_5$ which acts as a donor reducing the dielectric to a semiconductor when processed at the low partial oxygen pressures necessary for nickel electrodes. Furthermore, these dielectric compositions contain second phases after sintering, Ceramic Transactions, 32, (1993), which are not desirable when fabricating multilayer capacitors with thin layers. The processes for fabricating of multilayer capacitors of these X8R dielectrics and also X7R type dielectrics, Ceramic Transactions, 32, p69–80(1993), can effect the value of the temperature coefficient of capacitance so that it may be necessary to adjust the ceramic formulation to achieve the desired specifications in a given process.

We have now developed a dielectric material which can be fabricated into multilayer capacitors with nickel, palladium or palladium/silver alloy inner electrodes which have a variation of capacitance with temperature of less than ±20% over the temperature range −55° C. to 140° C. as compared to the value at 25° C. and no second phases are apparent in the microstructures. Optional additions of various oxides can be used to adjust the temperature coefficient of capacitance at 125° C. without a significant degradation of the insulating properties of the dielectric.

SUMMARY OF THE INVENTION

Accordingly, the present invention provides a sinterable dielectric ceramic powder composition comprising 95 to 98 parts by weight of a major ingredient consisting of 97.0 to 99.5 mole % barium titanate, 0.5 to 3.0 mole % magnesium oxide or a precursor therefor and 0 to 2.0 mole % manganese oxide or a precursor therefor and 0 to 0.2 mole % cobalt oxide or a precursor therefor; 2 to 5 parts by weight of a minor ingredient consisting of a ternary mixture of 15 to 30 mole % barium oxide or a precursor therefor, 15 to 30 mole % silicon dioxide or a precursor therefor and 40 to 70 mole % calcium titanate, which composition can be fabricated into multilayer ceramic capacitors with nickel, nickel alloy, palladium or palladium/silver alloy inner electrodes, the so formed capacitors having a variation of capacitance with temperature of less than ±20% over the range −55° C. to 140° C. as compared to the value at 25° C. and not containing any second phases after sintering.

DETAILED DESCRIPTION OF THE INVENTION

The compositions of the present invention may include optional additions of one or more of silver oxide, lanthanum oxide, praseodymium oxide, zinc oxide, nickel oxide, aluminum oxide and/or zirconium oxide or precursors therefor, in an amount which does not exceed 2% by weight of the combined major ingredient and ternary oxide mixture. These additions may be made to alter the temperature coefficient of capacitance at 125° C. without significant degradation of the insulating properties of the dielectric.

The dielectric composition of the present invention when fired has a dielectric constant of above 2500 at 25° C. and a dissipation factor of less than 2% at 25° C.

The present invention also includes within its scope a method for the preparation of a multilayer ceramic capacitor which method comprises forming a stack of a plurality of layers of a sinterable dielectric composition as hereinbefore defined, interleaved with inner electrodes of nickel, a nickel alloy, palladium or a palladium/silver alloy and co-firing the said multilayer stack, the so formed capacitors having a variation of capacitance with temperature of less than ±20% over the range −55° C. to 140° C. as compared to the value at 25° C. and do not contain any second phases after sintering. The techniques for the fabrication of multilayer capacitors are well known in the art.

In a more preferred embodiment of this invention the sinterable dielectric ceramic powder composition consists of 96.5 to 96.7 parts by weight of a major ingredient consisting of 98.6 to 98.8 mole % barium titanate, 0.80 to 0.85 mole % hydrated magnesium carbonate and 0.37 to 0.38 mole % manganese carbonate and 0.11 to 0.12 mole % cobalt oxide; 3.3 to 3.5 parts by weight of a ternary mixture of 25.0 to 25.5 mole % barium carbonate, 25.0 to 25.5 mole % silicon dioxide and 49 to 50 mole % calcium titanate, which when fabricated into multilayer ceramic capacitors with nickel, nickel alloy, palladium or palladium/silver alloy inner electrodes have a variation of capacitance with temperature of less than ±15% over the temperature range −55° C. to 145° C. as compared to the value at 25° C. and do not contain any second phases after sintering.

The palladium/silver alloy which may be used to form the inner electrodes is preferably 70% silver/30% palladium. Examples of nickel alloys which may be used to form the internal electrodes are 95% nickel/5% aluminium or 89.47% nickel/10.53% silicon.

The present invention will be described according to the following no limiting examples.

EXAMPLE 1

To 612.31 g of high purity barium titanate powder (HPB TAM Ceramics Inc.) was added 2,018 g hydrated magnesium carbonate (equivalent to 0.219 moles MgO), 0.236 g cobalt oxide, 1.15 g manganese carbonate, 8.84 g barium carbonate, 2.691 g silicon dioxide and 11,906 g calcium titanate. This mixture was ball milled for 1 hour with 5000 g of a yttria stabilised zirconia milling media with 800 cc deionized water. The resulting slurry was dried and screened through a 40 mesh screen.

400 g of the resulting powder was charged into a ball mill with 109.9 g Binder No. 73210 and 96.0 g Binder No. 73211 (both supplied by MSI Ltd; USA), together with 1920 g of 0.5 inch diameter yttria stabilized zirconia media and milled for 16 hours to obtain a homogeneously dispersed slurry.

The slurry had a viscosity in the range of from 1.5 to 3 Pas (1500 to 3000 centipoise). The slurry was filtered and cast in accordance with standard techniques, into a tape having a thickness of 0.0040 cm. The tape was then printed with a nickel ink, RD153 supplied by Cookson Matthey B.V; Maastricht, The Netherlands and laminated to give 10 active layers by procedures well known in the art. Nickel ink was painted onto the capacitors to form electrical terminations during co-sintered using the following procedure.

The binders were removed by heating the capacitors at 2° C. per minute to 900° C. in wet nitrogen and the capacitors were held in this atmosphere at this temperature for 11 hours. Dry nitrogen gas was then introduced into the furnace and the temperature increased to 1310° C. at 4° C. per minute. A mixture of carbon dioxide and carbon monoxide was then introduced into the furnace and heating continued at 4° C. per minute to 1360° C. such that the partial oxygen pressure at this temperature was calculated to be $10^{-8}$ atmospheres according to the ratio of carbon dioxide to carbon monoxide. The capacitors remained at this temperature for 2 hours to co-sinter the dielectric and electrodes. The flow of carbon dioxide and carbon monoxide was stopped and nitrogen gas was then introduced and the furnace allowed to cool to room temperature at 4° C. per minute.

Silver termination paste (DuPont No. 4822) was baked onto the co-fired nickel terminations at 300° C. The capacitance (C), dissipation factor (DF) and capacitance change with temperature versus capacitance at 25° C. were measured with a HP4274A capacitance bridge over the temperature range −55° C. to +145° C. The dielectric constant (K) was calculated using the fundamental relationship:

$$C=(KK_oAn)/t$$

where $K_o$=permittivity of free space

Figure 1:
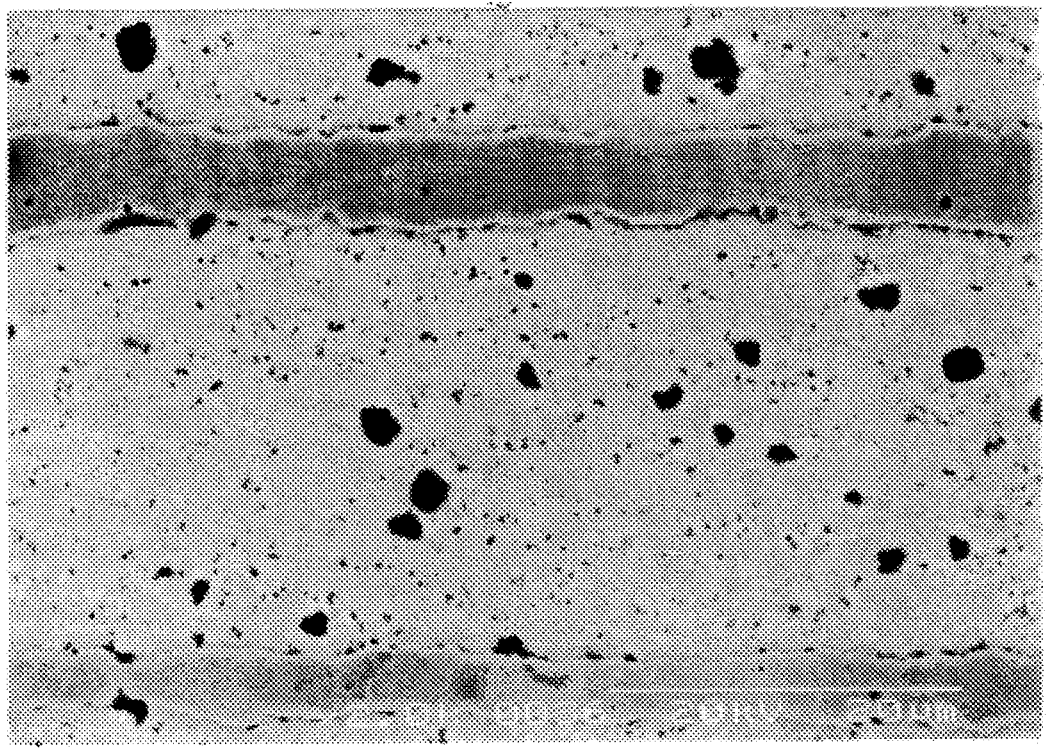
FIG. 1 is a scanning electron microscopy image of a section through a capacitor prepared according to Example 1.
Figure 2:
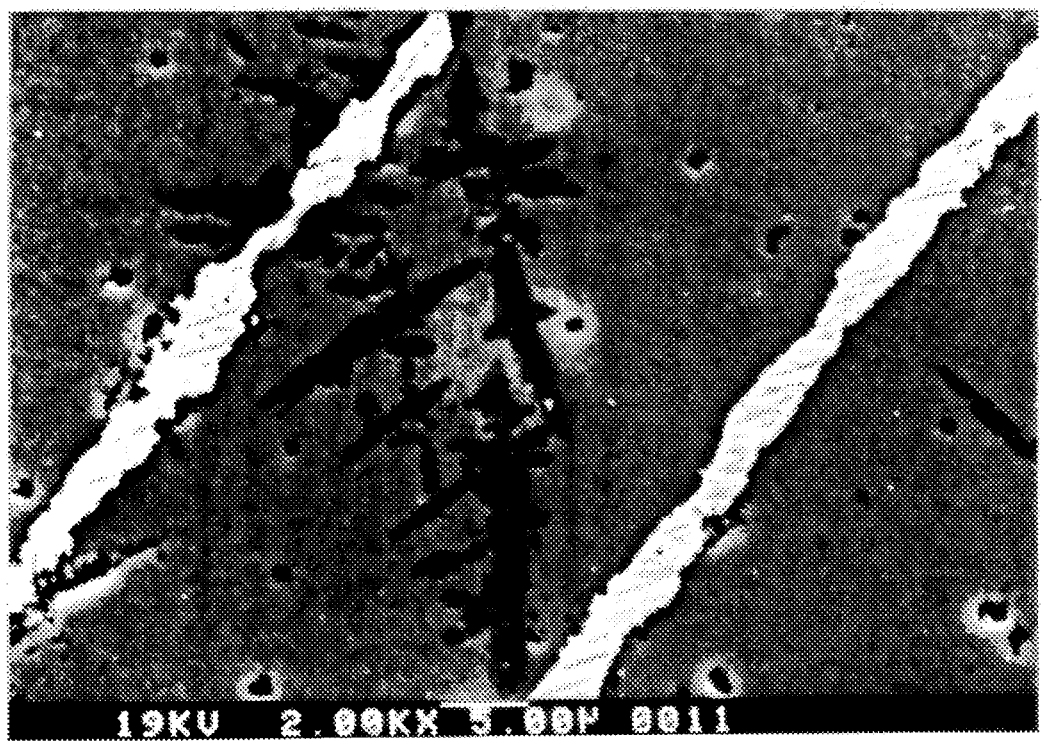
FIG. 2 is a scanning electron microscopy image of a section through an X7R capacitor prepared from a barium titanate composition containing $Nb_2O_5$.

A=area of electrode overlap n=number of active dielectric layers t=dielectric thickness The properties of the multilayer capacitors are summarized in Table 1 and a scanning electron microscopy image of a section through one of these capacitors is shown in FIG. 1 showing no second phases in comparison to FIG. 2, a similar image of an X7R type multilayer capacitor prepared from a barium titanate composition containing $Nb_2O_5$.

TABLE 1

| Capacitance (nF) at 25° C. | | 95 |
|---|---|---|
| DF (%) at 25° C. | | 1.25 |
| K at 25° C. | | 2886 |
| TC (%) | −55 | −12.2 |
| at | 25 | 0 |
| Temperature | 85 | +8.7 |
| (°C.) | 105 | +10.0 |
| | 125 | +10.5 |
| | 135 | −.01 |
| | 145 | −13.2 |

EXAMPLE 2

Multilayer ceramic capacitors were prepared in the same manner as described in Example 1 except that a 70 percent palladium, 30 percent silver alloy was used as internal electrodes. The multilayer capacitors were then sintered in air at 1360° C. for 2 hours after the binders were removed by heating at 260° C. for 48 hours and silver terminations were formed by firing on the aforementioned termination paste at 815° C. for 1 hour. The dielectric properties were measured in the same way as for Example 1 and are summarized in Table 2.

TABLE 2

| | | |
|---|---|---|
| Capacitance (nF) at 25° C. | | 76 |
| DF (%) at 25° C. | | 1.16 |
| K at 25° C. | | 2915 |
| TC (%) at Temperature (°C.) | −55 | −7.61 |
| | 25 | 0 |
| | 85 | +7.31 |
| | 105 | +7.67 |
| | 125 | +12.73 |
| | 135 | −2.20 |
| | 145 | −11.28 |

EXAMPLES 3–14

Multilayer ceramic capacitors were manufactured according to Example 1 but with various amounts of manganese dioxide replacing the manganese carbonate (Examples 3, 5 and 6), with no manganese present (Example 4), with no cobalt present (Example 7) and various combinations of the major and minor ingredients (Examples 8–12). In Example 13 barium carbonate and silicon oxide from the minor part were milled then calcined at 1150° C. for 2 hours, milled to a mean particle size less than 3 μm and combined with the other ingredients by further milling. This mixture was dried at 400° C. before manufacturing multilayer capacitors by the method described in Example 1. In Example 14 the hydrated magnesium carbonate from the major part and with barium carbonate and silicon oxide from the minor part were milled. This mixture was calcined at 1150° C. for 2 hours, milled to a mean particle size less than 3 μm and combined with the other ingredients by further milling. This was dried at 400° C. before manufacturing multilayer capacitors by the method described in Example 1. The compositions are summarized in Table 3 and the electrical results in Table 4.

TABLE 3

| Example Number | Major Ingredient (mole %) | | | | wt. % | Minor Ingredient (mole %) | | | wt. % |
|---|---|---|---|---|---|---|---|---|---|
| | BaTiO$_3$ | MgCO$_3$ | CoO | MnO$_2$ | | BaCO$_3$ | SiO$_2$ | CaTiO$_3$ | |
| 3 | 98.70 | 0.825 | 0.100 | 0.375 | 96.6 | 25.3 | 25.3 | 49.4 | 3.4 |
| 4 | 99.07 | 0.829 | 0.101 | 0 | 96.6 | 25.3 | 25.3 | 49.4 | 3.4 |
| 5 | 97.96 | 0.819 | 0.098 | 1.123 | 96.6 | 25.3 | 25.3 | 49.4 | 3.4 |
| 6 | 97.23 | 0.813 | 0.097 | 1.860 | 96.6 | 25.3 | 25.3 | 49.4 | 3.4 |
| 7 | 98.80 | 0.825 | 0 | 0.375 | 96.6 | 25.3 | 25.3 | 49.4 | 3.4 |
| 8 | 98.70 | 0.825 | 0.100 | 0.375 | 97.2 | 16.9 | 16.9 | 66.2 | 2.8 |
| 9 | 98.70 | 0.825 | 0.100 | 0.375 | 98.1 | 0 | 0 | 100 | 1.9 |
| 10 | 98.70 | 0.825 | 0.100 | 0.375 | 99.0 | 0 | 0 | 100 | 1.0 |
| 11 | 98.70 | 0.825 | 0.100 | 0.375 | 98.3 | 25.3 | 25.3 | 49.4 | 1.7 |
| 12 | 98.70 | 0.825 | 0.100 | 0.375 | 96.4 | 22.0 | 35.0 | 43.0 | 3.6 |
| 13 | 98.68 | 0.826 | 0.118 | 0.376 | 96.2 | 25.3 | 25.3 | 49.4 | 3.8 |
| 14 | 98.68 | 0.826 | 0.118 | 0.376 | 96.2 | 25.3 | 25.3 | 49.4 | 3.8 |

TABLE 4

| Example Number | K | DF (%) | TC (%) at Temperature (°C.) | | | | |
|---|---|---|---|---|---|---|---|
| | | | −55 | 85 | 125 | 140 | 145 |
| 3 | 2512 | 1.58 | −15.7 | 4.8 | 2.1 | −16.4 | −22.7 |
| 4 | 2979 | 1.90 | −16.2 | 7.5 | 3.6 | −15.8 | −22.6 |
| 5 | 2830 | 1.40 | −13.2 | 2.8 | 2.4 | −16.4 | −22.6 |
| 6 | 3067 | 1.24 | −12.7 | 2.3 | 3.4 | −15.9 | −22.2 |
| 7 | 2835 | 1.51 | −15.2 | 3.8 | 1.7 | −16.6 | −22.9 |
| 8 | 2626 | 1.56 | −14.9 | 6.0 | 6.8 | −13.7 | −20.4 |
| 9* | 2337 | 2.51 | −15.4 | 16.0 | 18.5 | −9.6 | −18.1 |
| 10* | 2551 | 3.20 | −18.0 | 12.1 | 13.9 | −17.4 | −25.5 |
| 11* | 2627 | 1.98 | −17.1 | 2.8 | 4.0 | −21.8 | −28.7 |
| 12* | 3063 | 2.34 | −17.5 | 18.6 | 11.6 | −9.8 | −17.2 |
| 13 | 2684 | 1.59 | −16.2 | 7.3 | 0 | −17.2 | −23.1 |
| 14 | 2715 | 1.69 | −15.3 | 5.3 | −1.5 | −16.8 | −22.6 |

*These Examples are outside the range of the claims of this Patent.

EXAMPLES 15–21

Multilayer capacitors were manufactured according to Example 3 except with the additions of various oxides as defined in Table 5. Capacitors were also prepared according to Example 1 with an addition of nickel oxide (Table 5.). The insulation resistance (IR) of these multilayer capacitors measured at 50 V after 120 seconds, the temperature coefficient of capacitance at 125° C. (from measurements made according to Example 1), and resistance×capacitance (RC) at 125° C. are shown in Table 5.

TABLE 5

| Example | Addition | % | TC at 125° C. (%) | IR at 125 °C. (GΩ) | RC at 125 °C. (ΩF) |
|---|---|---|---|---|---|
| 3 | none | 0 | 2.1 | 14.7 | 1080 |
| 15 | Al$_2$O$_3$ | 0.75 | 11.0 | 14.3 | 1340 |
| 16 | ZnO | 1.00 | 3.8 | 15.2 | 1490 |
| 17 | La$_2$O$_3$ | 0.25 | −3.0 | 10.1 | 838 |
| 18 | Ag$_2$O | 0.25 | 4.4 | 11.5 | 1030 |
| 19 | Pr$_6$O$_{11}$ | 0.50 | −23.2 | 16.3 | 1450 |
| 20 | ZrO$_2$ | 0.20 | −8.0 | 14.1 | 1440 |
| 21 | NiO | 0.10 | −0.3 | 24.3 | 1960 |

We claim:

1. A sinterable dielectric ceramic powder composition comprising 95 to 98 parts by weight of a major ingredient consisting of 97.0 to 99.5 mole % barium titanate, 0.5 to 3.0 mole % magnesium oxide or a precursor therefor and 0 to 2.0 mole % manganese oxide or a precursor therefor and 0 to 0.2 moles cobalt oxide or a precursor therefor; 2 to 5 parts by weight of a minor ingredient consisting of a ternary mixture of 15 to 30 mole % barium oxide or a precursor therefor, 15 to 30 mole % silicon dioxide or a precursor therefor and 40 to 70 mole % calcium titanate, which composition can be fabricated into multilayer ceramic capacitors with nickel, nickel alloy, palladium or palladium/silver alloy inner electrodes, the so formed capacitors having a variation of capacitance with temperature of less than ±20% over the range −55° C. to 140° C. as compared to the value at 25° C. and not containing any second phases after sintering.

2. A dielectric composition as claimed in claim 1 which comprises 96.5 to 96.7 parts by weight of a major ingredient consisting of 98.6 to 98.8 mole % barium titanate, 0.80 to 0.85 mole % hydrated magnesium carbonate, 0.37 to 0.38 mole % manganese carbonate and 0.11 to 0.12 mole % cobalt oxide; 3.3 to 3.5 parts by weight of a ternary mixture of 25.0 to 25.5 mole % barium carbonate, 25.0 to 25.5 mole % silicon dioxide and 49 to 50 mole % calcium titanate, which composition can be fabricated into multilayer ceramic capacitors with nickel, nickel alloy, palladium or palladium/silver alloy inner electrodes, the so formed capacitors having a variation of capacitance with temperature of less than ±15% over the temperature range −55° C. to 145° C. as compared to the value at 25° C.

3. A dielectric composition as claimed in claim 2 which additionally includes one or more oxides selected from the group consisting of silver oxide, lanthanum oxide, praseodymium oxide, zinc oxide, nickel oxide, aluminum oxide, zirconium oxide, precursors therefor and mixtures thereof, in an amount which does not exceed 2% by weight of the combined major ingredient and ternary oxide mixture.

4. A dielectric composition as claimed in claim 1 which when fired has a dielectric constant of above 2500 at 25° C.

5. A dielectric composition as claimed in claim 1 which has a dissipation factor of less than 2% at 25° C.

6. A dielectric composition as claimed in claim 1 which additionally includes one or more oxides selected from the group consisting of silver oxide, lanthanum oxide, praseodymium oxide, zinc oxide, nickel oxide, aluminum oxide, zirconium oxide, precursors therefor and mixtures thereof, in an amount which does not exceed 2% by weight of the combined major ingredient and ternary oxide mixture.

* * * * *